United States Patent Office 3,642,736
Patented Feb. 15, 1972

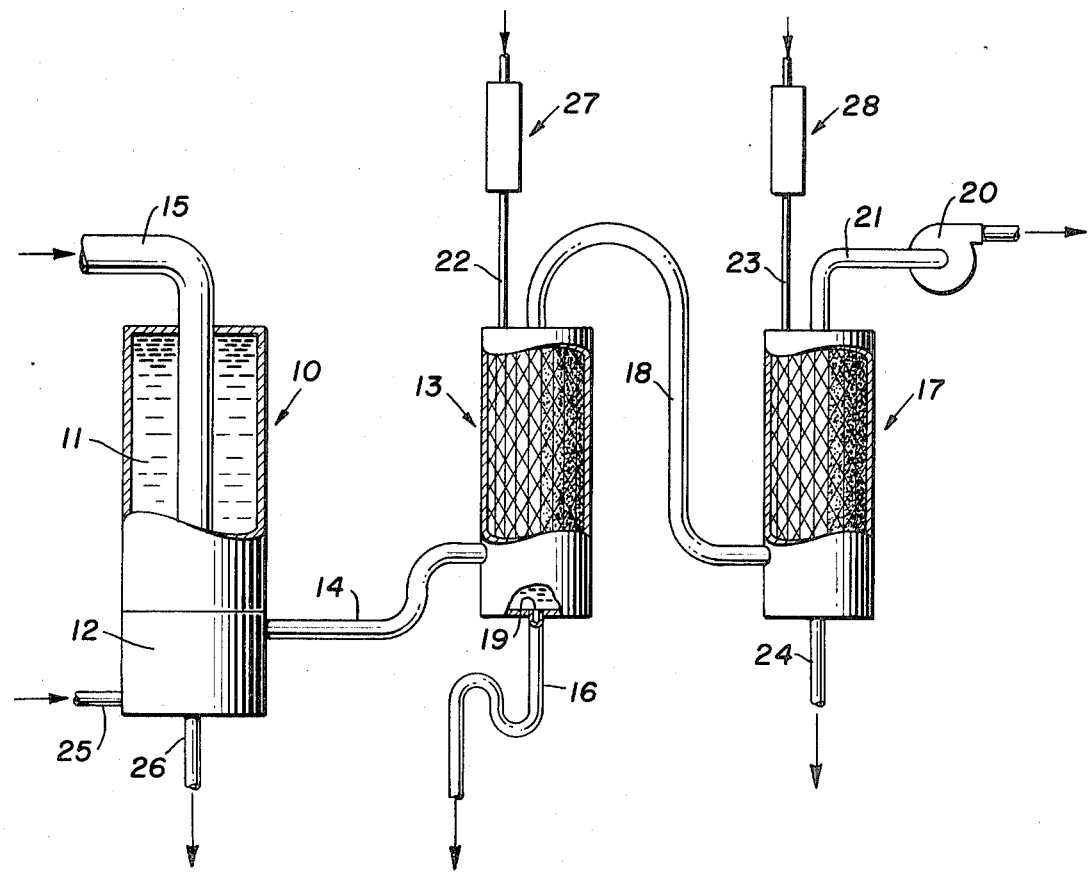

3,642,736
METHOD FOR RECOVERING VENTED MONOMERS
Arley L. Downs, Decatur, Ala., assignor to Monsanto Company, St. Louis, Mo.
Filed May 13, 1969, Ser. No. 824,099
Int. Cl. C08f 15/22
U.S. Cl. 260—85.5                    5 Claims

ABSTRACT OF THE DISCLOSURE

A method is herein described for effectively recovering volatile, unreacted monomers which are ordinarily lost to the atmosphere during copolymerization of acrylonitrile and unsaturated organics, which comprises dehumidifying the vapor mixture and thereafter absorbing the vapor mixture in absorbing liquids.

BACKGROUND OF THE INVENTION

This invention relates to a novel and improved method of recovering volatile, unreacted monomers which pass or are unavoidably released from processing vessels during polymerization of monomer mixtures containing acrylonitrile and unsaturated monomers and require no further purification prior to reintroduction in subsequent polymerization reactions.

In the process of continuously polymerizing mixtures of monomers it is usual that some of the monomers remain unreacted and pass out and through the various vessel vents resulting in significant losses thereof. From an economic standpoint, it is obviously desirable to recover such unreacted monomer mixtures. Aside from the economic consideration recovery of volatile monomers would ameliorate the general working conditions since operating personnel would not be exposed to toxic and, often, explosive vapors.

SUMMARY OF THE INVENTION

Polymers of acrylonitrile with minor proportions of olefinically unsaturated copolymerizable compounds such as vinyl acetate, methyl methacrylate and methacrylonitrile are known and employed in forming fiber-forming materials. In the continuous polymerization of monomer mixtures, such as about 85% acrylonitrile and up to about 15% of an acrylic ester, about 65 to 95% of each of the monomers are converted into polymer. Since almost all processing equipment is maintained at somewhat elevated temperatures, losses of volatile monomer vapors from such equipment are often significant.

A principal object of this invention is to provide a novel and effective method for recovering volatile monomers which would normally be released to the atmosphere from a continuous polymerization of acrylonitrile based copolymer.

The present invention is to provide the art with a method to obviate such costly losses of volatile monomer vapors, a desideratum hitherto unsupplied, namely, a process for recovering unreacted monomers from a vapor mixture comprising monoethylenic components including acrylonitrile.

Briefly, in accordance with the invention, the steps of the method which comprise cooling a vapor mixture having monomers therein to about 15° C., whereby the mixture is substantially dehumidified, passing the cooled mixture in contact with a liquid consisting essentially of acrylonitrile whereby the monomers ae esentially absorbed by the liquid and then passing the remaining vapors thereof in contact with an aqueous phase whereby the acrylonitrile is substantially absorbed by the aqueous phase.

BRIEF DESCRIPTION OF THE DRAWING

The drawing attached herewith depicts a flow diagram after this invention.

DESCRIPTION OF THE PREFERRED EMBODIMENT

The operation will be described in connection with the accompanying drawing which shows more or less diagrammatically the equipment employed and illustrates the process, which is the subject matter of the invention.

By a manifold system, vapors coming from the various processing vessels are brought together into a header 15 and thereby drawn into a condenser 10 having a cooling jacket 11. The warm vapors are cooled within the condenser 10 so that they exit at a temperautre of at least 15° C., or less forming a condensate which is collected in a catch pot 12. The cooled vapors leave the condenser 10 by line 14 to the lower portion of an acrylonitrile scrubber 13 having a packed column and pass countercurrent to a flow of acrylonitrile whereby the monomers being soluble in the acrylonitrile are absorbed therein. The drain 19 of scrubber 13 containing the monomers is removed through line 16 and returned to the polymerization reactor feed stream (not shown). The vapors which are relatively rich in acrylonitrile are thereafter fed to a second packed water scrubber 17 wherein water passes countercurrent to the vapors, the vapors entering the lower portion of scrubber 17 by line 18. The vapor effluent from the water scrubber 17 is drawn through line 21 by a blower 20 connected to the system which exhausts the stream to the atmosphere. In the water scrubber 17, acrylonitrile is removed from the vapors and subsequently fed to a distillation column (not shown) where the acrylonitrile is stripped from the water and returned to the polymerization reactor feed stream.

It is preferable that the vapors collected from the process vessels be cooled to at least 15° C., in order to dehumidify the vapors so that the initial scrubber contains less than 1.5% water. When water over approximately 2.0% by weight is carried through line 16 there is created a troublesome situation of aqueous and organic phase separation accompanied by polymerization and clogging. It is also preferable that the vapors be introduced downwardly through the condenser and that the flow of monomer vapor absorbing liquid be in countercurrent direction in the two scrubbing towers.

The scrubbers as used herein denote packed towers as conventionally employed in gas absorption and consist of cylindrical columns equipped with a gas inlet and distributing space at the bottom, a liquid inlet and distributing space at the top; liquid and gas outlets at the bottom and top, respectively; and each having a supported mass of inert material. The supported mass may be made of a number of chemically inert solid materials or plates, sieve trays, etc., that also provide good contact between liquid and vapor or gas phase. As aforementioned, the inlet liquid, acrylonitrile, is allowed to pass over the top of the mass or packing and uniformly downward wetting the same. The absorbing liquid acrylonitrile irrigates the scrubber and is allowed to uniformly distribute itself at a definite flow rate to gas-vapor flow. The cooled vapors from the condenser enter the initial and last scrubber from below and are distributed over the bottom portion and pass upwardly through the interstices countercurrent to the liquid flow. The packing allows a larger surface area of contact whereby the volatile monomers are absorbed by the liquid. External cooling may be provided since high temperature tends to undo the absorption.

Column packing may be any material fairly light in weight and chemically inert to liquids herein used. Such materials as clay, coke, porcelain, glass, stainless steel and ceramic have been found to be satisfactory. Also, dumped packing of regular units, such as rings, grids, spirals, and crushed solids offer little chance for channeling and have been advantageously employed after this invention.

Copolymers of acrylonitrile with one or more ethylenically unsaturated compounds are generally prepared in an aqueous slurry.

Examples of olefinically unsaturated monomeric copolymerizable with acrylonitrile and embrasive within this invention include the following: acids such as acrylic and methacrylic acids; esters such as methyl methacrylate, butyl, octyl, methoxymethyl and chloroethyl methacrylate and the corresponding esters of acrylic and α-chloroacrylic acids; methacrylonitrile, vinyl and vinylidene halides, such as vinyl chloride, vinyl bromide, vinyl fluoride, vinylidene chloride, 1-fluoro-1-chloroethylene; vinyl carboxylates, such as vinyl acetate, vinyl chloroacetate, vinyl propionate and vinyl stearate; N-vinylimides, such as N-vinylphthalimide and N-vinyl succinimide; vinyl aryl compounds, such as styrene and vinyl naphthaline; and other compounds, such as methyl vinyl ketone, chlorotrifluorethylene, methyl fumarate methyl vinyl sulfone, methyl vinyl sulfoxide, methyl vinyl sulfide, fumaronitrile, maleic anhydride, and various isomeric vinylpyridines, such as 2-vinylpyridine, 3-vinylpyridine, and 4-vinylpyridine, and the vinyl-substituted alkyl pyridines, such as 4-ethyl-2-vinylpyridine, 5-ethyl-2-vinylpyridine, 4 - methyl-3-vinylpyridine, 5-ethyl-3-vinylpyridine, 4,6 - dimethyl-2-vinylpyridine, 2 - methyl-5-vinylpyridine, and 6 - methyl-2-vinylpyridine, the isomeric vinylpyrazines, the various isomeric vinylquinolines, the vinyl oxazoles, the vinyl imidazoles and the vinyl benzoxazoles.

By dehumidifying vapor mixtures as used herein, it is meant that the warm vapor mixtures are collected and brought into contact with a cooler atmosphere as provided by a condenser or heat exchanger and reduced to a level such that the vapor cannot retain all its water vapor, and water condenses, thus reducing the moisture content of the mixture.

This process is adaptable to either batch or continuous operation.

In order that those skilled in the art may better understand how the present invention can be carried into effect, the following example is given by way of illustration and not by way of limitation.

EXAMPLE

Vented vapors from condensers, pellitizers, rotary vacuum filters reactor slurry hold tanks, polymerization vessels, etc., containing monomers and water vapors from the continuous acrylic polymerization process were passed through a vent collection header to a shell and tube condenser having chilled water as coolant. The shell and tube condenser had a heat transfer area of 276 sq. ft. and was provided with a condenser catch pot. The vented vapors passed through the condenser at from about 100 to 400 cubic feet per minute and left the condenser at from about 10 to about 15° C. The vapor mixture entering the condenser was air saturated with monomers, viz, acrylonitrile, vinyl acetate and vinyl bromide, as well as water vapors at temperatures from about 50° C. to 70° C. The mixture contained water and about 302 pounds per hour monomer. In the shell and tube condenser, the vapors were cooled to about 10° C., wherein approximately 95% of all the water vapor was condensed therefrom.

The vapors, after passing through the condenser, were fed to the bottom portion of a packed scrubber 13 (Raschig ring of 1-inch diameter). The vapors passed countercurrent to acrylonitrile as the absorbing liquid. This liquid was lowered in temperature prior to irrigating the scrubber by passing through a cooler 27 connected by lie 22 to said scrubber, the liquid being held between 5 to 15° C. The column outlet or drain contained less than a saturated concentration of water in acrylonitrile (about 1.5% by wt., at 15° C.) as determined by Karl Fischer titration. Control of the water concentration in the packed scrubber was accomplished by regulating the exit vapor temperature from the shell and tube condenser. From ca. 500 to 3500 pounds per hour of acrylonitrile liquid flow through the scrubber was used. Approximately 97 pounds per hour of monomer was recovered.

The vapors which passed on through the packed scrubber having the acrylonitrile as the absorbing liquid were thereafter fed to another packed scrubber numeral 17 in the drawing (2 ft. x 10 ft.) wherein the vapor passed countercurrent to 20 to 30° C., water from cooler 28 and line 23 whereby absorption of the remaining vapors containing acrylonitrile was accomplished. The aqueous drain 24 was routed to catch pots under the shell and tube condenser via line 25 and then on to a steam stripping column 26 for recovery and reuse of the acrylonitrile monomer in the polymerization process.

Movement of the vapor through the system was accomplished through attaching the vapor exit of the last scrubber to the suction of a positive displacement blower, whereby the process vessels experience slight vacuum (0–10 in., $H_2O$). One hundred thirty seven pounds/hour monomer was recovered from the scrubber.

As many apparently widely different embodiments of this invention may be made without departing from the spirit and scope thereof, it is to be understood that the same is not to be limited to the specific embodiment thereof except as defined in the appended claims.

I claim:

1. In the polymerization of a major amount of acrylonitrile with unsaturated monomers a process for recovering volatile, unreacted monomers from a vapor mixture that normally find vent and would consequently be lost to the atmosphere, which comprises: condensing the vapor mixture whereby the vapor mixture is substantially dehumidified, and thereafter passing the remaining vapor mixture in contact with an absorbing liquid comprising acrylonitrile whereby the unsaturated monomers are essentially absorbed by said liquid.

2. A process as recited in claim 1 wherein the unreacted monomers are ethylenically unsaturated compounds selected from the group consisting of methyl methacrylate, vinyl acetate, styrene, vinyl bromide, vinyl chloride and vinylidene chloride.

3. A process in accordance with claim 1 wherein the vapor mixture is condensed at a temperature between about 10° C., and about 15° C.

4. A process as recited in claim 1 wherein any remaining vapor mixture after passing the absorbing liquid is thereafter passed in contact with an aqueous phase whereby any residual vapor of acrylonitrile is substantially absorbed by said aqueous phase.

5. In the polymerization of a major amount of acrylonitrile with unsaturated monomers a process for recovering volatile, unreacted monomers from a vapor mixture that normally find vent and would consequently be lost to the atmosphere, which comprises: condensing the vapor mixture at a temperature between about 10° C., and 15° C., whereby the vapor mixture is substantially dehumidified, passing the remaining vapor mixture in contact with an absorbing liquid comprising acrylonitrile whereby the monomers are essentially absorbed by said liquid, said unreacted monomers being ethylenically unsaturated compounds selected from the group consisting of methyl methacrylate, vinyl acetate, styrene, vinyl bromide, vinyl chloride and vinylidene chloride, and passing thereafter any remaining vapor mixture in contact with an aqueous phase whereby any residual vapor of acrylonitrile is substantially absorbed by said aqueous phase.

References Cited
UNITED STATES PATENTS

| | | | |
|---|---|---|---|
| 3,308,109 | 3/1967 | Sampson et al. | 260—85.5 S |
| 3,359,187 | 12/1967 | Veazey et al. | 260—85.5 S |
| 3,378,467 | 4/1968 | Colton et al. | 260—94.9 F |

HARRY WONG, JR., Primary Examiner

U.S. Cl. X.R.

260—63, 78.5, 79.3, 80.6